Figure 1:
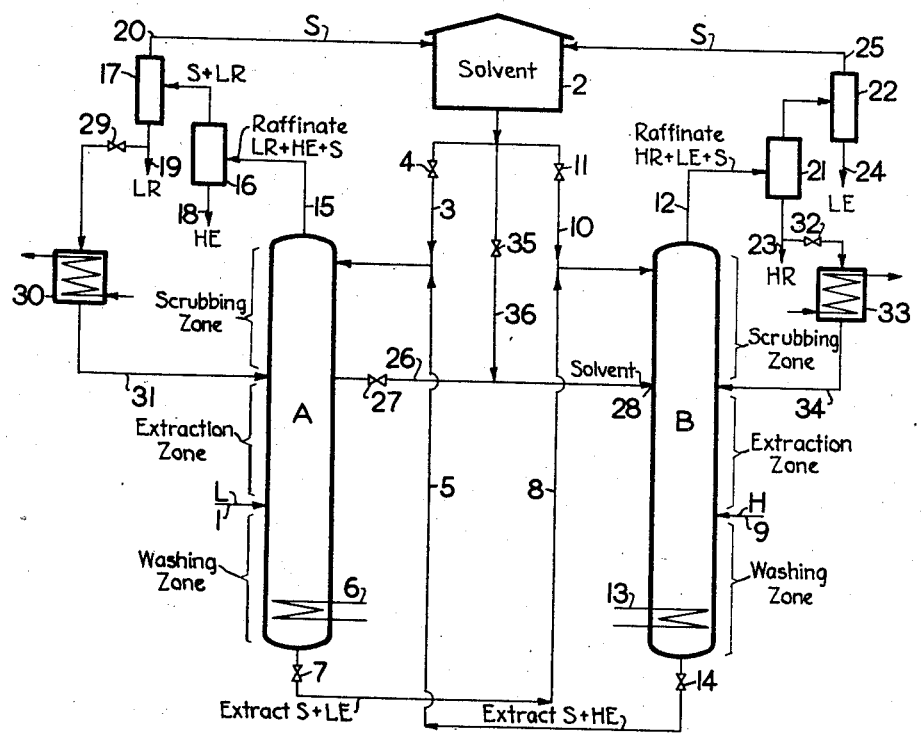

Inventor: Sijbren Tijmstra

Patented Jan. 20, 1942

2,270,827

UNITED STATES PATENT OFFICE 2,270,827

PROCESS FOR THE SOLVENT EXTRACTION OF LIQUID MIXTURES

Sijbren Tijmstra, Berkeley, Calif., assignor to Shell Development Company, San Francisco, Calif., a corporation of Delaware Application July 9, 1940, Serial No. 344,520

2 Claims. (Cl. 196—13)

This invention relates to an improved process for the extraction of a plurality of liquid mixtures with a common selective solvent or mixture of solvents, and is an improvement on the processes described in the van Dijck Patent No. 2,201,549, issued May 21, 1940, and in the van Dijack and Schaafsma Patent No. 2,201,550, issued May 21, 1940.

The above-mentioned specifications describe processes for extracting two or more liquid mixtures containing qualitatively different components or groups of components in which each liquid mixture, or certain components thereof, are separable from one or more of the other mixtures, or from one or more components thereof. Briefly, these processes are carried out by extracting a first liquid mixture with an extracting agent containing a selective solvent (which may contain a dissolved component or components of another mixture from another extraction) to produce a first extract phase and a first raffinate phase, which are separated; the first extract phase is then employed as the extracting agent for extracting the second liquid mixture, preferably in countercurrent, to produce second extract and raffinate phases. If more than two mixtures are to be extracted, the second extract phase is employed to extract the third mixture, these operations being repeated, always employing the extract phase from one extraction as the extracting agent for the next extraction. The final extract phase (e. g., the second extract phase, if only two liquid mixtures are being extracted) is employed as the extracting agent in the first extraction. Such a process has come to be known as "reciprocal extraction," and this term will herein be used to indicate this process.

In reciprocal extraction processes two main operations are involved in any particular countercurrent extraction stage, viz., extraction and scrubbing. "Extraction" is the selective removal from the initial mixture introduced into the particular extraction stage of one or more components which is (or are) preferentially soluble in the selective solvent, the component or components being dissolved in the solvent to form the extract phase withdrawn from the stage. "Scrubbing" is the removal from the extract phase, introduced as the extracting agent into the particular countercurrent extraction stage, of the component or components contained in the introduced extract phase (i. e., the preferentially soluble component or components from the mixture extracted in the previous extraction stage), the said component or components being dissolved in that portion of the initial mixture introduced into the particular countercurrent extraction stage which is not dissolved in the selective solvent.

The countercurrent extraction stages in such processes may consist of any suitable means for effecting countercurrent contact between the extracting agent and the liquid mixture, such as packed or stirred towers, or a series of mixing and settling units. It is convenient to regard the countercurrent apparatus in each stage as comprising at least two zones: The part near the point of introduction of the initial feed mixture, wherein extraction predominates, is designated as the extraction zone, and the part between the extraction zone and the point of introduction of the extraction agent is designated as the scrubbing zone.

In some extraction processes there may also be distinguished a washing zone occupying the part of the contact apparatus located beyond the point of introduction of the initial liquid mixture in the direction of flow of the extracting agent. In fact, in those cases where the extract phase, i. e., the solution of preferentially soluble component or components dissolved in the solvent, flowing off from the countercurrent contact zone past the point of introduction of the liquid mixture into another zone (washing zone) is treated in countercurrent either with a portion of the extract phase wholly or partly freed of solvent (which may be produced, for example, by chilling the said extract phase present in the washing zone, either within or outside said washing zone, or by distilling all or part of the solvent from the extract phase flowing off from the countercurrent contact zone or the washing zone, or by recovery from the raffinate phase obtained in a subsequent stage of the process), or with a second solvent which is miscible only to a limited extent with the solvent employed for the extraction, the name "washing" is applied to this treatment, the apparatus in which the said washing is carried out being referred to as the "washing zone."

From the foregoing it is apparent that the apparatus used for reciprocal extractions should consist of at least a scrubbing zone and an extraction zone.

In the present specification, initial liquid mixtures are designated by capital letters, e. g., L and H. The selective solvent is designated by the letter S. The component or components which are preferentially dissolved in the selective solvent S (i. e., the extracts) are indicated by the letter E, preceded by the letter indicating the initial mixture originally containing the same; thus, LE represents an extract from the mixture L, and HE represents extract from the mixture H. The insoluble parts (i. e, the raffinates) are represented by the letter R, preceded by the letter indicating the liquid mixture in which this insoluble part originally occurred; thus, LR is the insoluble part or raffinate of the mixture L.

The essential operations involved in reciprocal extraction may be illustrated as follows: Considering a simple case, wherein only two initial liquid mixtures, L and H are extracted, and each mixture contains only one soluble component or group of components and only one insoluble component or group of components, in the first extraction stage the mixture L (consisting of $LE+LR$) is extracted to form a first extract phase which is predominantly a solution of LE in S. In the second extraction stage, the second mixture H (consisting of $HE+HR$) is flowed countercurrently to the first extract phase; in the extraction zone of this stage the solvent S selectively dissolves HE from the second mixture to form a second extract phase containing $S+HE$, leaving HR undissolved; and in the scrubbing zone HR selectively dissolves LE from the first extract phase (scrubbing), forming a second raffinate phase containing $HR+LE$. The second extract phase is then employed as the extracting agent in the first countercurrent extraction stage, wherein similar operations take place: The solvent S dissolves LE from the first mixture in the extraction zone to form the aforementioned first extract phase, leaving LR undissolved; and in the scrubbing zone LR selectively dissolves HE from the second extract phase, forming the first raffinate phase containing $LR+HE$.

Although definite scrubbing and extraction zones have been referred to, it should be noted that in practical operations it is not always possible to distinguish sharply between the extraction zone and the scrubbing zone, since both scrubbing and extraction, as defined heretofore, sometimes occur throughout the countercurrent treaters.

The extent to which the components LE and HE are scrubbed from the solvent in the two scrubbing zones, and the extent to which the components LE and HE are extracted from their original mixtures in the two extraction zones in the case described above, depend upon the distribution coefficients prevailing in each of these zones, and upon the relative quantities of the two phases occurring in these zones. In accordance with the present invention, it was found that the relationship between these various quantities can be rendered more favorable, and the sharpness and/or the completeness of the separation effected by the reciprocal extraction can be improved, by transferring solvent between adjacent or non-adjacent countercurrent extraction stages at one or more intermediate points.

More particularly, a portion (i. e., less than all) of the solvent flowing through one or more of the countercurrent stages or apparatus is withdrawn at one or more points intermediate the points of introduction of the initial liquid mixture and the extracting agent (i. e., the extract phase from another stage) while continuing the remaining materials through the apparatus. The withdrawn solvent may be substantially pure or it may contain dissolved component, depending upon the point at which it is withdrawn, and upon the completeness with which the scrubbing is effected in the apparatus. The withdrawn solvent is then introduced into another stage or apparatus at a point intermediate to the points of introduction of the initial mixture and the extracting agent.

The transfer of solvent between adjacent stages in accordance with the present invention can be practiced in connection with any of the specific embodiments of the reciprocal extraction process disclosed in the above-mentioned specifications.

Thus, the process may be practiced in conjunction with the feature disclosed by van Dijck and Schaafsma, according to which raffinate components are separated from one or more of the raffinate phases, and recycled into the respective countercurrent extraction stages from which they were separated, each recycle stock being introduced at a point between the point of inlet of the mixture to be extracted and the inlet of the extracting agent. In this embodiment the raffinate components are preferably introduced at such a distance from the point of introduction of the mixture to be extracted that the latter, at the point of introduction of the raffinate components, has for the greater part been stripped of its extract components. In the latter case, the part of the extraction apparatus situated between the inlet of the recycled raffinate component and the inlet of the extracting agent is the scrubbing zone, and the part situated between the inlet of the recycled raffinate component and the inlet of the mixture to be extracted is the extraction zone.

The process may be applied both with simple and with more complicated methods, according to which it is known to split up a liquid mixture into a number of components with the aid of one or more selective solvents.

Reciprocal extraction can be applied in an apparatus, each stage of which consists only of an extraction zone and a scrubbing zone. In order to split up a specified liquid mixture, e. g., L, use may be made of a single selective solvent S, or of a mixture of several entirely miscible solvents. As solvents there may also be employed two liquids or liquid mixtures, such as S and P, which are miscible only to a limited extent and are flowed in countercurrent to each other. These two liquids, therefore, when contacted with each other, constitute two liquid phases. They should satisfy the requirement that the components of the mixture L to be split up, or of the mixtures to be split up, e. g., L and H, are distributed in different proportions over the two said phases of S and P.

If the extraction is carried out according to the latter process, either the solvent S or the solvent P may be used or have been used for the extraction of another liquid mixture.

The process according to the invention may also be carried out in one or more apparatus consisting of a scrubbing zone plus an extraction zone plus a washing zone. The mixture to be split up is then introduced into the apparatus described on the boundary between the extraction and the washing zone.

As washing agent in the washing zone there may be used: (1) a part of the most soluble components of the mixture, e. g., of the extract obtained or (2) a liquid P which is immiscible or miscible to a limited extent only with the selective solvent S employed in the extraction, or (3) a mixture of the two liquids (1) and (2).

A number of the extraction methods referred to above, which may be applied to the process according to the present invention, are described in the U. S. Patents Nos. 2,023,109, 2,081,720, and 2,071,719, and in the French patent specification No. 45,965, addition to No. 755,291.

The process may be applied to all types of liquid mixtures, which should satisfy the requirement that each of these mixtures can be treated with the same selective solvent.

Examples of liquid mixtures are, for instance: hydrocarbon oils, the boiling ranges of which do not overlap, such as kerosene, spindle oil and heavy lubricating oil. As extracting agent there may be used a selective solvent of the type of liquid $SO_2$; a few of these are: furfural, cresylic acid, BB' dichloroethyl ether, quinoline, phenol, and nitrobenzene.

As a specific example, gas oil may be introduced into one extraction stage, and machine oil into the other, and furfural employed as the selective solvent.

A mixture of organic chlorine compounds and a mixture of corresponding alcohols can also be split up, for instance with the aid of a polyvalent alcohol as a selective solvent.

It is also possible to separate nitrogen bases from various hydrocarbon oils of different boiling ranges with the aid of phenol; to separate, after oxidation of various paraffin fractions, the oxidation products from the non-oxidized paraffin wax with the aid of alcohol, each oxidized paraffin fraction being treated in a separate extraction stage; and to separate chlorine compounds from different fractions containing the latter and the corresponding olefines, with the aid of ethyl alcohol.

Chlorine compounds can be separated from the corresponding alcohols with the aid of water or polyvalent alcohols. With the same solvents, alcohols can likewise be separated from the corresponding olefines.

Mono-ethanolamine may be used for separating fatty acids from alcohols prepared therefrom by reduction.

Another example is the separation of a mixture of a higher alcohol and a phenol, which may be separated with the aid of water as a selective solvent. Numerous other examples of mixtures which may be separated by means of solvents are given in the U. S. Patent No. 2,081,721.

The process according to the invention may also be applied when splitting up the raffinate and/or extract components prepared during a previous application of the process according to the invention.

Figure 3:
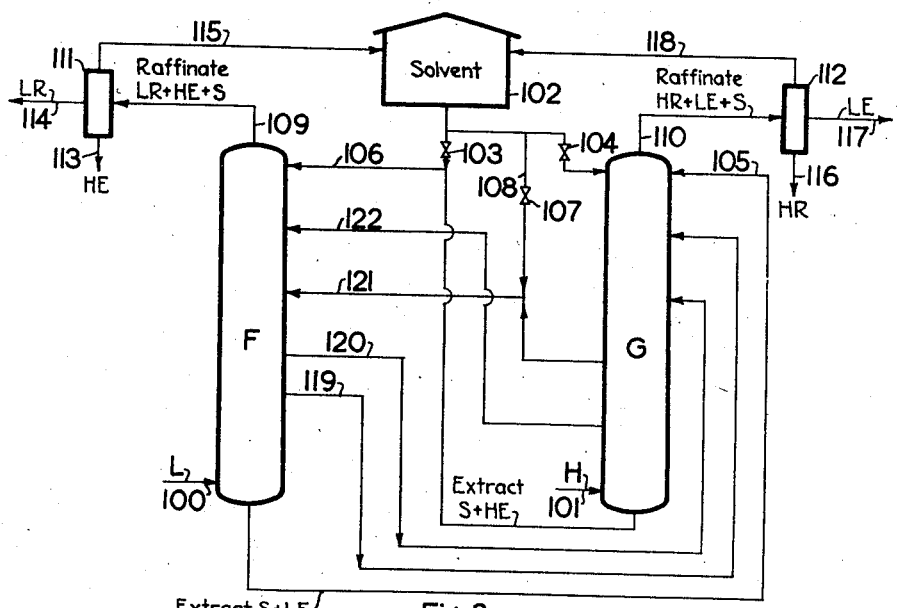
Figure 2:
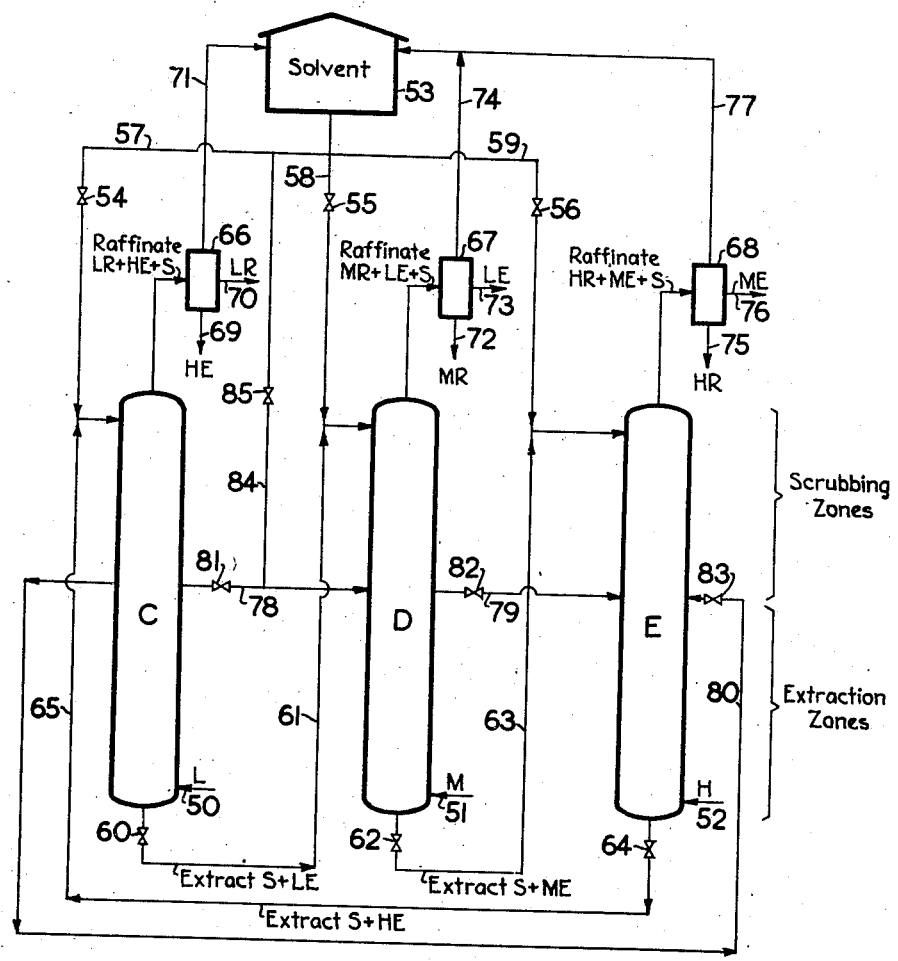

The details of the process, and the requirements relative to the separability of the components of the mixtures outside of the process, are more fully disclosed in the aforesaid specifications, and will be further briefly indicated in connection with the accompanying drawings, in which Figures 1, 2 and 3 are schematic flow diagrams illustrating alternative modes of applying the invention.

Referring to Figure 1, the letters A and B represent countercurrent extraction apparatus, which may, for example, comprise packed towers suitable for countercurrent flow of liquids of different specific gravities, or a series of interconnected mixing and settling devices. These units are interconnected by conduits as shown, and may be provided with suitable pumps, valves, heat exchangers, and other auxiliary equipment, not shown, for effecting the desired flow described below.

One of the mixtures to be extracted, L, such as a light hydrocarbon distillate, is continuously fed into the apparatus A at an intermediate point via a conduit 1. Initially, selective solvent, such as furfural, is fed from the tank 2 to the top of the column via conduit 3, and valve 4, it being understood that when the selective solvent is lighter than the mixture L, the solvent is introduced at the bottom, and that in such case all inlet and outlet connections to the apparatus are correspondingly inverted. After the unit is in operation, the valve 4 may be closed or opened only enough to replace solvent losses, and an extract phase from the apparatus B is introduced via the conduit 5, as explained hereafter.

The solvent and the liquid L flow countercurrently in the portion of the apparatus A above the level of the inlet 1, resulting in the formation of an upwardly flowing raffinate phase and a downflowing first extract phase, the latter being a solution of LE in the solvent S. The first extract phase may be withdrawn from the apparatus A at or just below the level of the feed pipe 1, as shown in Figure 2; its composition may, however, be further improved by treatment in the washing zone by any of the washing methods outlined heretofore. In the embodiment illustrated, washing is effected by cooling the extract phase by means of a cooling coil 6, resulting in the separation of an intermediate or secondary raffinate from the descending extract phase. The secondary raffinate phase rises in the washing zone, flowing countercurrently to the descending extract phase, and removing from it valuable constituents of the mixture L which it is desired to include in the raffinate phase. The secondary raffinate phase rises past the level of the inlet pipe 1 and is thus re-introduced into the countercurrent extraction.

The improved first extract phase is withdrawn from the bottom of the apparatus A via valve 7 and is introduced at the top of the apparatus B through conduit 8 as the extracting agent for the extraction of another liquid mixture. The other mixture to be extracted, H, such as a heavier hydrocarbon distillate or residue, is introduced into the apparatus B at an intermediate point, via conduit 9. Initially, or during operations to replenish losses, fresh solvent may be introduced from the tank 2 via conduit 10 and valve 11. As a result of the countercurrent flow of the liquid H and the first extract phase, LE is scrubbed from the latter, and HE is extracted from the former. Although the scrubbing and extraction are not always sharply confined to distinct zones, it is convenient to consider these zones separately:

In the extraction zone (including roughly the lower half of the apparatus between the inlets of the liquid H and the first extract phase) H flows upwardly from the level of the inlet 9, and solvent S (freed from LE in the manner described below) flows downwardly. By the countercurrent flow, the solvent selectively dissolves HE from the mixture H, forming a second extract phase which flows down past the level of the inlet 9, and leaving HR undissolved. The latter is the raffinate from the extraction zone.

In the scrubbing zone (including part of the apparatus above the extraction zone) the raffinate phase HR flows upwardly from the extraction zone and the first extract phase flows downwardly. As a result of the countercurrent flow, the raffinate HR scrubs LE from the first extract phase, so that the solvent S which flows down from the scrubbing zone into the extraction zone is entirely or for the greater part freed from LE. The final raffinate phase, consisting of HR+LE, together with a small amount of S, is withdrawn at the top of the apparatus B via conduit 12.

The second extract phase, consisting of S+HE, may be withdrawn just below the level of the inlet 9, or it may be cooled by means of the cooling coil 13 and washed in the washing zone below the level of the inlet 9 in the manner described for apparatus A. The improved second extract phase is withdrawn via valve 14 and is introduced at the top of the apparatus A via conduit 5 as the extracting agent, the valve 4 being closed or throttled. In the apparatus A the component HE is scrubbed from the solvent in the scrubbing zone, and the component LE is extracted from the liquid L in the extraction zone, in the manner described above for the apparatus B. The raffinate phase, consisting of LR+HE, together with a small amount of S, is withdrawn at the top of the apparatus B via conduit 15.

The raffinate phase from apparatus A may be treated to separate the components in any suitable apparatus which may, for example, consist of a single fractionating column, or, as shown, of a pair of distilling units 16 and 17, each of which may be operated to isolate one component. Thus, HE may be withdrawn at 18 as the bottom product of the unit 16, and the top product of this unit may be further distilled in the unit 17 to yield LR at 19 and the solvent S at 20. The latter may be returned to the tank 2. The raffinate from the apparatus B may be similarly separated in the distilling units 21 and 22, HR being withdrawn at 23, LE at 24, and S at 25, the latter being also returned to the tank 2. It should be understood that it is not necessary that HE be separable from LR by distillation, or that LE be similarly separable from HR, since other methods of separation may be employed. Further, in certain cases a mixture of HE+LR may be desired as the final product, and it is in such case only necessary to remove S from the raffinate phase.

The steps described above (with the exception of the washing zones, which may be omitted) constitute the usual reciprocal extraction process, the advantage of which is that the extract phases do not have to be distilled.

To understand the nature of the present invention, it is desirable to consider the distribution constants prevailing in the various zones of the apparatus. The distribution constant relates to the solubility of a given solute with respect to two different solvents and may be defined as the ratio at equilibrium of the concentration of the solute in one solvent to its concentration in the other solvent. The distribution constants for the soluble components LE and HE between the selective solvent and the phase in equilibrium therewith will, in general, be different for the different zones. While these constants are not quite uniform through any one zone, it is convenient to consider average values in any single zone. These constants are defined as follows:

In the extraction zone of apparatus A:
$$K_{SLE} = \frac{\text{volume concentration of LE in solvent phase}}{\text{volume concentration of LE in residue phase}}$$

The "residue phase" in this equation is the phase rich in RL, i. e., the portion of the liquid L which is not dissolved in the solvent.

In the scrubbing zone of apparatus B:
$$K_{HLE} = \frac{\text{volume concentration of LE in solvent phase}}{\text{volume concentration of LE in HR raffinate phase}}$$

In the extraction zone of apparatus B:
$$K_{SHE} = \frac{\text{volume concentration of HE in solvent phase}}{\text{volume concentration of HE in residue phase}}$$

The "residue phase" in this equation is the phase rich in HR, i. e., the portion of the liquid H which is not dissolved in the solvent.

In the scrubbing zone of apparatus A:
$$K_{LHE} = \frac{\text{volume concentration of HE in solvent phase}}{\text{volume concentration of HE in LR raffinate phase}}$$

The magnitudes of these four constants may, within certain limits, be varied by operating these four zones at different temperatures by means of cooling or heating coils or jackets, it being desirable to select conditions which will make $K_{SLE}$ and $K_{SHE}$ as large as possible, and $K_{HLE}$ and $K_{LHE}$ as small as possible.

It was found that in a process of this type the relationships between these distribution constants are often such that there is lack of balance between the extractions in the extraction zones and the scrubbing actions in the scrubbing zones. For example, it may occur that complete extraction and scrubbing are effected in the apparatus A, but complete extraction is not effected in the apparatus B, and/or LE is not sufficiently scrubbed from the solvent S in the scrubbing section of the apparatus B.

In accordance with the present invention, it was found that this situation can be remedied by transferring a portion of the solvent phase at one or more points from one apparatus to the other at one or more intermediate points. In the situation given in the preceding paragraph, i. e., with either insufficient extraction or scrubbing in the apparatus B, or both insufficient extraction and scrubbing in the apparatus B, it is desirable to transfer the solvent phase from the apparatus A to the apparatus B.

As a general rule, for the most balanced condition between scrubbing and extraction, it is desirable to transfer solvent from the apparatus wherein the ratio of the distribution constant in the extraction zone to the distribution constant in the scrubbing zone is high into the apparatus wherein this ratio is small. When more than two apparatus are employed (as in Figure 2) the same rule applies, i. e., the solvent phase is transferred so that the greatest quantity of solvent phase is withdrawn from the apparatus wherein this ratio is largest, and the most solvent is introduced into the apparatus wherein the ratio is the smallest. It should be understood, however, that the invention is not restricted to this direction of flow, since in certain operations the specifications of the products may be such that a balance between the extraction and scrubbing actions is not desired.

The transfer of the solvent phase is illustrated in Figure 1, wherein the conduit 26 is connected to the apparatus A so as to withdraw a portion of the descending solvent phase. When, as in this embodiment, only a single stream of solvent is transferred, the solvent is preferably withdrawn from a point between the scrubbing zone and the extraction zone. As was explained heretofore, at this point the solvent is substantially pure, having been stripped of HE in the scrubbing zone, but being not yet laden with LE. The descending solvent phase can be isolated by any known means, such as by providing an auxiliary settler into which a portion of the mixture in the apparatus is fed, and from which the settled solvent layer is withdrawn, while the other layer is re-introduced into the apparatus at or near the point of withdrawal. In installations employing a series of mixers and settlers, it is convenient to remove a portion of the solvent layer from the lowermost settler in the scrubbing zone. The solvent layer, in whatever manner isolated, flows through valve 27 and is introduced into the apparatus B, preferably at a point between the scrubbing and extraction zones, such as point 28.

While the withdrawal of solvent phase from a point between the scrubbing and extraction zones has been indicated as the preferred embodiment, it should be understood that it is also possible to transfer a solvent stream at other levels in the scrubbing or extraction zones. Moreover, the solvent stream may be introduced into the apparatus B at a point corresponding to the point at which the stream was withdrawn from the apparatus A, or at a different point, e. g., at a higher or at a lower level, as illustrated in Figure 3.

The process may also be practiced in conjunction with the recycling of the raffinate phase disclosed more particularly in the aforesaid van Dijck and Schaafsma specification. Thus, a portion of the raffinate LR separated from the still 17 may be passed through valve 29, cooled in heat exchanger 30, and introduced into the apparatus A at a point intermediate the points of the introduction of the mixture L and the extracting agent, such as at 31, between the extraction and scrubbing zones. Similarly, a portion of the raffinate HR may be flowed via valve 32, cooled in heat exchanger 33, and fed into the apparatus B at 34. The return of the raffinate components in this manner provides a larger quantity of scrubbing liquid, and thereby improves the scrubbing action.

When the apparatus is in operation, it is necessary to add solvent to compensate for the solvent withdrawn in the raffinate phases and returned to the tank 2. While the solvent can be introduced through the conduits 3 and 10 as indicated heretofore, it is preferable to introduce it together with the transferred solvent stream. A conduit 35 and valve 36 may be provided for this purpose.

The invention may also be applied to reciprocal extractions involving more than two mixtures. Apparatus suitable for extracting three mixtures is illustrated in Figure 2, wherein washing zones and re-circulation of raffinate have been omitted, it being understood that these features may be practiced also in connection with this embodiment. Referring to the drawings, C, D, and E are countercurrent contact apparatus, providing extraction zones and scrubbing zones, as indicated. The three mixtures, L, M, and H, to be extracted, such as a gas oil, and middle oil, and a lubricating oil, respectively, are introduced into the apparatus at 50, 51 and 52, respectvely. Initially solvent S from the tank 53 is fed via valves 54, 55 and 56, and conduits 57, 58 and 59 to the tops of the apparatus. Extract phase from the apparatus C consisting predominantly of S+LE is withdrawn at the bottom via valve 60 and fed to the top of the apparatus D via conduit 61, wherein it is used as the extracting agent for the extraction of M; extract phase from the apparatus D consisting predominantly of S+ME is withdrawn at the bottom via valve 62 and fed to the top of the apparatus E via conduit 63 wherein it is used as the extracting agent for the extraction of H; and extract phase from the apparatus E, consisting predominantly of S+HE, is withdrawn at the bottom via valve 64 and fed to the top of the apparatus C via conduit 65, wherein it is used as the extracting agent for the extraction of L.

The extracting agents flow countercurrently to the liquids introduced into the respective apparatus, and form extract and raffinate phases in the manner described above for Figure 1. The raffinate phases are withdrawn from the tops of the apparatus C, D and E, and introduced into separating units 66, 67 and 68, respectively, which may be distilling units as described above. In these units the raffinate from the apparatus C is separated into HE, withdrawn at 69, LR, withdrawn at 70, and S, which is returned to the tank 53 via conduit 71. The raffinate from the apparatus D is separated into MR, withdrawn at 72, LE, withdrawn at 73, and S, which is returned to the tank 53 via conduit 74. The raffinate from the apparatus E is separated into HR, withdrawn at 75, ME, withdrawn at 76, and S, which is returned to the tank 53 via conduit 77.

After the requisite amount of solvent has been introduced into the contact apparatus, the valves 54, 55 and 56 may be throttled to feed into the system only the quantity of solvent required to compensate for the solvent removed with the raffinates. It is, however, preferred to close these valves entirely and to introduce the necessary solvent into one or more of the conduits 78, 79 and 80, as, for example, through conduit 84 and valve 85.

The transfer of solvent according to the instant invention is effected by withdrawing solvent phase from one or more apparatus and introducing it into one or more apparatus, preferably in accordance with the rule previously given. For this purpose, conduits 78, 79 and 80 may be provided, each arranged to withdraw a portion of the solvent phase and transfer it to another column at rates controlled by valves 81, 82 and 83. While three connections have been shown, it will in general be sufficient to employ only two of such connections, as will be apparent from the following example:

Consider the case where the ratio of the distribution constant in the extraction zone to the distribution constant in the scrubbing zone for each of the three apparatus is as follows: Apparatus C, 1.94; apparatus D, 0.77; apparatus E, 0.75. A balance between the scrubbing and extraction in the various zones can be effected by transferring the following quantities of solvent through the connections for every 100 parts by volume of solvent contained in the extract phase flowing off through the valve 60: From apparatus C to apparatus D via valve 81, 93 parts; from apparatus D to apparatus E via valve 82, 55 parts, the valve 83 being kept closed. The same result can be achieved by closing the valve 81, and transferring 38 parts via valve 82 from the apparatus E to the apparatus D (in a direction opposite to that previously considered), and transferring 93 parts from the apparatus C to the apparatus E via valve 83. The same result can also be achieved by closing the valve 82, and transferring 38 parts via valve 81 from the apparatus C to apparatus D and transferring 55 parts via valve 83 from apparatus C to apparatus E.

It will be noted that the largest amount of solvent is withdrawn from the apparatus C wherein the ratio of distribution constants is the greatest, and that the greatest quantity of solvent is introduced into the apparatus E wherein the ratio is the smallest.

It is also possible to transfer solvent at more than one level between the countercurrent apparatus and to transfer solvent in opposite directions. Such an embodiment is illustrated in Figure 3, wherein F and G are countercurrent contact apparatus. The mixtures L and H to be extracted are introduced at the bottoms of the apparatus at 100 and 101, and selective solvent from tank 102 is initially fed via valves 103 and 104 to the tops of the apparatus F and G. The solvent and the liquids L and H flow countercurrently within the countercurrent contact apparatus and, in the manner described above the Figure 1, form raffinate and extract phases. The extract phase from the apparatus F, consisting of $S+LE$, is withdrawn from the bottom of the apparatus and introduced into the top of the apparatus G via conduit 105. Similarly, the extract phase from apparatus G, consisting of $S+HE$, is withdrawn from the bottom and introduced into the top of the apparatus F via conduit 106. When the process is in operation, the valves 103 and 104 may be partially closed. Preferably, they are entirely closed and the solvent required to replace solvent withdrawn from the apparatus with the raffinates is thereafter introduced into the system at an intermediate level, as, for example, by means of valve 107 and conduit 108.

Raffinates from the apparatus F and G are withdrawn via conduits 109 and 110, and are separated into their constituent parts in distilling units 111 and 112. From the raffinate flowing out of apparatus F there is obtained HE, separated at 113, LR, separated at 114, and S, returned to the tank 102 via line 115. Similarly, from the raffinate flowing out of apparatus G, there is obtained HR, withdrawn at 116, LE, withdrawn at 117, and S, returned to tank 102 via line 118.

It should be understood that washing zone and means for the recirculation of raffinate components in the manner described for Figure 1 may also be employed in the embodiment according to Figure 3.

The transfer of solvent between the apparatus F and G at intermediate points is effected by means of conduits 119, 120, 121, and 122, these conduits, as well as the conduits 105 and 106, being provided with suitable valves and pumps, not shown, as may be required to regulate and effect the flow of material in the directions indicated by the arrows. In this embodiment, the solvent streams are transferred to inverted corresponding points in the two apparatus. Thus, if the apparatus G were inverted from the position shown, each of the transfer lines 119 to 122, as well as the lines 105 and 106, would join points at corresponding levels in the two apparatus. Since, however, the process is not restricted to the use of towers of the type shown, but may be practiced with interconnected mixers and settlers, it is preferable to refer to points instead of levels. The expression "inverted corresponding points" is, accordingly, employed in this specification and claims to designate points bearing this relationship.

Thus, regardless of the type of apparatus employed, the points in the two apparatus into which the initial liquids to be extracted are introduced are corresponding points, and the points at which the raffinates are withdrawn are also corresponding points. The point in one apparatus where the mixture to be extracted is introduced and the point in the other apparatus where the raffinate phase is withdrawn, are inverted corresponding points.

It should be further noted that in the intermediate transfer lines, solvent flows out of each apparatus at points near the point of introduction of the initial liquid to be extracted, and into the apparatus near the point at which the raffinate is withdrawn. Stated in another way, solvent is preferably transferred from each extraction zone into the scrubbing zone of the other apparatus.

It is not necessary that the quantity of solvent transferred via conduits 119 and 120 be equal to the amount of solvent transferred via conduits 121 and 122. Thus, it is sometimes desirable to transfer a greater quantity of solvent from the apparatus in which the ratio of the distribution constant in the extraction zone to the distribution constant in the scrubbing zone is higher to the apparatus wherein this ratio is lower. If, for example, this ratio is greater in the apparatus F than in the apparatus G, the quantity of material in the lines 119 and 120 may exceed the amount of material flowing in the lines 121 and 122. Furthermore, it is also possible in such a situation to reverse the flow in the line 121.

The embodiment according to Figure 3 is particularly valuable in situations wherein the material to be extracted, e. g., LE and/or HE, is composed of more than one substance having different distribution constants. As was indicated heretofore, LE and HE may represent groups of components. When the members of these groups have closely similar solubility characteristics they may be regarded as single components, but when these characteristics differ appreciably, complete extraction and scrubbing in reciprocal extractions is difficult and at times impossible according to the embodiment illustrated in Figure 1. By the transfer of solvent at a plurality of points to inverted corresponding points as shown in Figure 3, however, the extraction of such complex mixtures is facilitated. It is preferable in such a case to withdraw from each apparatus at least as many solvent streams (counting the extract phase withdrawn from the end of the apparatus as one stream) as there are individual substances or components of different solubility characteristics in the group of components to be extracted from the mixture introduced into said apparatus.

The term "liquid mixture" is generic to homogeneous liquid solutions and to liquid emulsions. It is, of course, not essential that the mixtures treated in the process be normally liquid, inasmuch as it is possible to liquefy such mixtures by the use of elevated temperatures or by dissolving them in suitable solvents.

I claim as my invention:

1. In a reciprocal extraction process wherein a plurality of at least two different initial liquid mixtures containing different components are extracted with the same selective solvent, each mixture containing a component which is preferentially soluble in said selective solvent and a component which is not preferentially soluble therein, and wherein each initial mixture is introduced into a separate countercurrent contact apparatus and therein flowed countercurrently to an extracting agent containing said selective solvent to form a raffinate phase containing the component which is not preferentially soluble and an extract phase containing solvent and the component which is preferentially soluble, the raffinate and extract phases are separately withdrawn from each apparatus and the extract phase from each apparatus being introduced into another of said apparatus as the extracting agent, whereby the soluble component contained in the extract phase introduced into each apparatus is scrubbed out of said introduced extract phase and withdrawn from the respective apparatus together with the raffinate phase, the improvement comprising the step of withdrawing a portion of the selective solvent from one apparatus at a plurality of points intermediate to the points of introduction of the initial liquid mixture and the extracting agent while continuing through the apparatus the remaining materials and introducing the withdrawn selective solvent into another apparatus at a plurality of inverted corresponding points intermediate to the points of introduction of the initial liquid mixture and the extracting agent.

2. The process according to claim 1 wherein solvent is withdrawn at intermediate points from an apparatus wherein the ratio of the distribution constant for the preferentially soluble component of the liquid extracted therein to the distribution constant of the preferentially soluble component scrubbed out of the extracting agent is higher and is introduced into an apparatus wherein said ratio is lower.

SIJBREN TIJMSTRA.